United States Patent Office 3,421,624
Patented Jan. 14, 1969

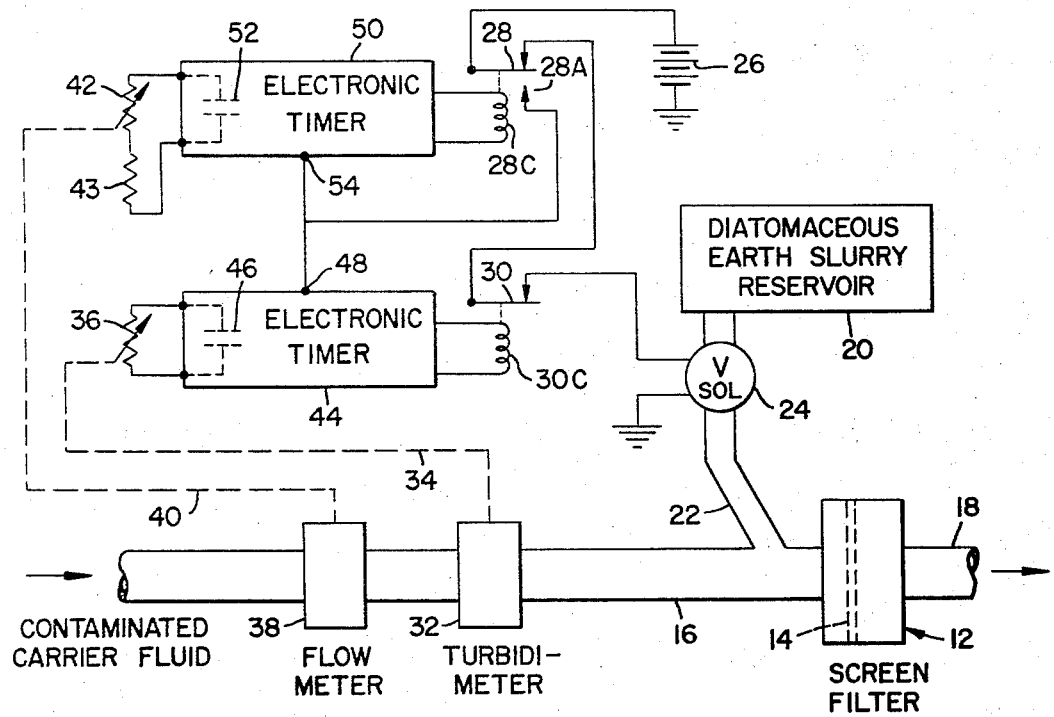
FIG_1
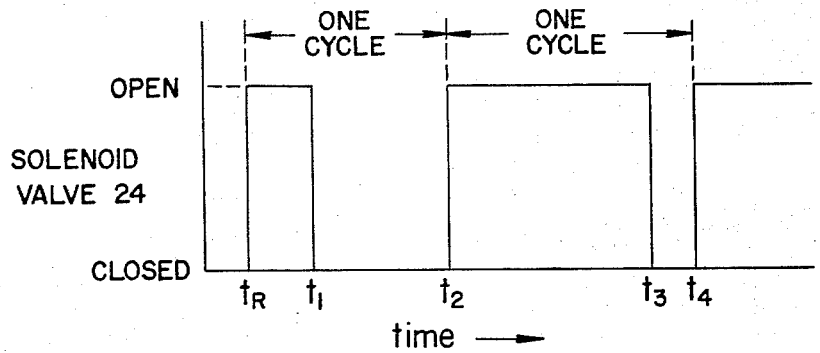
FIG_2

3,421,624
TIMING APPARATUS FOR FILTRATION SYSTEM
James R. Boyd, Oakland, Calif., assignor to De Laval
Turbine, Inc., Millbrae, Calif.
Filed June 6, 1966, Ser. No. 555,317
U.S. Cl. 210—96                    1 Claim
Int. Cl. B01d 37/02

ABSTRACT OF THE DISCLOSURE

Apparatus for timing the inflow duration of filtration medium into a filtration system. A simple solenoid valve either permits or arrests flow of the medium into the system and the rate of addition of the filtration medium is varied by varying the time sequence of opening and closing the solenoid valve. A first electric circuit generates an electric signal that has a time duration for a period inversely proportional to the rate of inflow of contaminated material. A second circuit is provided for generating within the above-mentioned time period an electric signal having an interval within the time period that is proportional to the degree of contamination. During the latter interval only is the solenoid valve open.

---

This invention relates to timing apparatus for controllably supplying a filtration medium, such as diatomaceous earth, to a filtering system, and more particularly to such timing apparatus that automatically and continually varies the quantity of and frequency with which the filtration medium is supplied to the system in accordance with the characteristics of the material under treatment by the filtration system.

Filtration systems with which apparatus according to the present invention is employed typically include an apertured element, such as a meshed screen, on which is initially coated a layer of diatomaceous earth or like filtration medium. A contaminated carrier fluid is passed through the coated screen in order to remove the contaminants and permit reuse of the carrier fluid. Filtration systems of this type are widely used in such applications as removing silt and/or sewage from water, removing contaminant materials from drycleaning fluid to permit reuse of the fluid, and removing contaminant particles from lubricating oil to permit reuse of the oil.

The effectiveness of filtration systems of the type referred to above is maintained by periodically adding to the carrier fluid upstream of the filtering screen a filtration medium such as a slurry containing diatomaceous earth, which slurry intermixes with the carrier fluid and contaminated particles and is captured at the screen filter. In this way the filter screen is continually supplied with a porous layer of diatomaceous earth or the like necessary for proper filtration.

In systems of this type it is necessary to vary the amount of the diatomaceous earth slurry that is supplied to the system in accordance with the degree of contamination of the carrier fluid and in accordance with the flow rate of carrier fluid into the system. Specifically, if the degree of contamination or turbidity of the contaminant fluid increases, the amount of diatomaceous earth slurry supplied to the system must be increased, and if the rate of inflow of carrier fluid is increased, the supply of diatomaceous earth slurry must be increased. The present invention provides apparatus for effecting such mode of control of the supply of diatomaceous earth slurry.

The degree of contamination or turbidity and the rate of inflow of the carrier fluid are usually mutually independent. It is therefore an object of the present invention to provide apparatus that supplies a diatomaceous earth slurry to a filtration system in direct proportion to the degree of contamination or turbidity of the carrier fluid and inversely proportional to the rate of inflow of the carrier fluid. This object is achieved by supplying the diatomaceous earth slurry through a valve that is repetitively opened and closed at a repetition rate proportional to the rate of carrier fluid inflow and that is retained in the opened condition for a time proportional to the degree of contamination or turbidity of the carrier fluid.

Another object is to achieve the above-described mode of control in a completely automated fashion which is accurate and which does not require monitoring or control by a human operator. Attainment of this object is made possible by the provision of a pair of electronic timers, one of which is turned on for a duration proportional to the rate of inflow of carrier fluid as sensed by a flow meter, and the other of which is turned on for duration proportional to the degree of contamination as sensed by a contamination measuring device, such as a turbidimeter.

A feature and advantage of the present invention which contributes to the simplicity of reliability of the apparatus is that an on-off solenoid valve is used to control the rate at which the slurry is supplied to the system, the variation in supply rate being accomplished by varying the on-time and the off-time of the valve. Accordingly, the use of continuously variable throttle valves is avoided as is the complex control elements necessary for controlling such valves.

Other objects, features and advantages will be more apparent after referring to the following specification and accompanying drawing in which:

FIG. 1 is a schematic diagram of a timing apparatus embodying the present invention; and FIG. 2 is a graph illustrating the operation of the circuit of FIG. 1 and wherein time is plotted on the abscissa and the position of the slurry supply valve is plotted on the ordinate.

Referring more particularly to the drawing, reference numeral 12 indicates a filter that includes a fine meshed screen indicated schematically at 14 on which diatomaceous earth is coated. Contaminated carrier fluid is supplied to the filter through an inlet pipe 16, and filtered, uncontaminated fluid is discharged from an outlet pipe 18. As is typical in such systems, diatomaceous earth slurry is supplied to the contaminated fluid in inlet pipe 16 from a reservoir 20 through a conduit 22. By continual addition of diatomaceous fluid upstream of filter 12 the active surface of the material on screen 14 is maintained at all times in a porous and effective condition.

A solenoid valve 24 is provided in conduit 22 intermediate reservoir 20 and inlet pipe 16 to control the amount of slurry supplied to the filtration system. Solenoid valve 24 is a conventional element and includes a coil which when energized opens the valve to permit slurry delivery through conduit 22 and which, when de-energized effects closure of the valve to arrest delivery of slurry through the conduit. Electric power for energizing the coil of valve 24 is provided by a power source 26 through a normally closed contact 28, openable in response to energization of a coil 28C and through a normally closed contact 30 openable by energization of a coil 30C. Contacts 28 and 30 are opened in a time sequence, to be described in detail subsequently, that is variable so as to accommodate varying rates of carrier fluid inflow and varying degrees of contamination or turbidity in the carrier fluid.

Interposed in inlet pipe 16 upstream of filter 12 is a turbidimeter 32 of conventional form that has an output link 34 attached to a variable resistor 36 so that the resistance across the variable resistor is directly proportional to the degree of contamination or turbidity of the fluid flowing through the inlet pipe. Turbidimeter 32 is shown in the present specification as exemplary of an element for sensing the degree of contamination of the fluid; obvious equivalents that will occur to those skilled in the art include elements which directly measure the chemical or electrochemical composition of the carrier fluid, the color of the fluid, or any like parameter that varies with the degree of contamination. Also interposed in inlet line 16 upstream of filter 12 is a flow meter 38 which has an output link 40 to which is attached a variable resistor 42 that has a resistance which varies inversely with the rate of inflow of carrier fluid through the inlet pipe. Connected in series with variable resistor 42 is a fixed resistor 43 which has a resistance approximately equal to the maximum resistance of variable resistance 36.

An electronic timer 44 is provided and includes input terminals to which resistor 36 is connected. Relay coil 30C is connected to the output of electronic timer 44. The electronic timer is a conventional circuit element that energizes coil 30C after a time duration proportional to the resistance of resistor 36 and typically includes a capacitor 46 which forms a timing circuit in cooperation with the resistor. Such timer also includes a reset terminal 48; when power from power source 26 is connected to the reset terminal through contact 28A, a time period is initiated which has a duration proportional to the resistance or resistor 36 and which terminates by energizing coil 30C.

A second electronic timer 50 is provided and has connected to the input thereof the series combination constituted by variable resistor 42 and fixed resistor 43. To the output of timer 50 relay coil 28C is connected. Electronic timer 50 is substantially identical to electronic timer 44 and includes a capacitor 52 which in conjunction with resistors 42 and 43 forms a timing circuit so as to energize relay coil 28C after a duration proportional to the resistance of the resistors. Electronic timer 50 additionally includes a reset terminal 54, energization of which through contact 28A initiates the interval established by the timer.

The operation of the present timing apparatus can be understood by assuming that screen filter 14 has been precoated with a diatomaceous earth layer and that contaminated carrier fluid is flowing into the filter through inlet pipe 16. The degree of contamination of the incoming fluid as sensed by turbidimeter 32 establishes a resistance across resistor 36 that is directly proportional to the degree of turbidity. The rate of inflow of contaminated carrier fluid is sensed by flow meter 38 which establishes a resistance across resistor 42 which is inversely proportional to the inflow rate.

Power is thus delivered to solenoid valve 24 from power source 26 through contacts 28 and 38, as a consequence of which the valve opens to inject a diatomaceous earth slurry into the system. After a time proportional to the degree of turbidity as sensed by turbidimeter 32, timer 44 energizes relay coil 30C, as a result of which contact 30 is opened and solenoid valve 24 is de-energized to arrest slurry delivery through conduit 22. At a time subsequent to energization of coil 30C by timer 44, electronic timer 50 energizes coil 28C to open contact 28 and close contact 28A. The time at which contact 28A is completed is inversely proportional to the flow rate of carrier fluid through flow meter 38. More specifically, if the flow rate sensed by the flow meter is relatively low, contact 28A will not be closed for a substantial interval, whereas if the flow rate is relatively high contact 28 will be closed shortly after contact 30 is opened by timer 44.

On closure of contact 28A, reset terminals 48 and 54 of the respective timers are supplied with power from power source 26, the timers are reset to de-energize coils 28C and 30C, and solenoid valve 24 is opened to deliver additional diatomaceous earth slurry to the contaminated carrier fluid in inlet pipe 16. Such delivery of the slurry continues for a time proportional to the turbidity of the carrier fluid after which electronic timer energizes coil 30C as previously described.

Referring now to FIG. 2, at time $t_R$ contact 28A has been closed, the timers have been reset and power has been supplied to solenoid valve 24, thus opening the valve. The valve remains open to afford delivery of the slurry through conduit 22 for a time interval proportional to the turbidity of the carrier fluid and at the end of the interval, at $t_1$, the valve closes when timer 44 energizes coil 30C to open contact 30. After an interval inversely proportional to the inflow rate of carrier fluid, timer 50 energizes coil 28C and the timers are reset at time $t_2$. In the graph of FIG. 2 it is assumed that the turbidity of the fluid in inlet pipe 16 has increased during the interval between time $t_1$ and time $t_2$. Accordingly, when the timers are reset by momentary closure of contact 28A, solenoid valve 24 will be opened for a longer duration, the duration terminating at time $t_3$. It is additionally assumed in connection with the graph of FIG. 2, that the flow rate of carrier fluid as sensed by flow meter 38 has increased during the interval subsequent to time $t_2$. Consequently, electronic timer will energize coil 28C after a very short interval, at time $t_4$, to immediately restart the cycle. The continuing operation of the system will now be apparent if it is remembered that the duration of slurry delivery through conduit 22 varies directly with the turbidity and that the frequency or repetition rate at which the solenoid valve 24 is opened and closed varies inversely with the rate of carrier fluid flow.

In one system designed according to the present invention variable resistor 36 is established at a range to afford a 0–15 second timing range in timer 44. That is to say, such system is capable of delivering diatomaceous earth through conduit 22 for any time interval from zero second to fifteen seconds. In such system fixed resistor 43 is selected so as to establish an interval at timer 50 of fifteen seconds (the maximum interval afforded by timer 44), and variable resistor 42 is selected to establish the interval afforded by timer at a range from the fixed fifteen second interval established by resistor 43 to a sixty second interval. Thus, if the inflow rate of contaminated fluid is high, resistor 42 will be at a relatively low value and timer 50 will cause recycling of the system after a relatively short interval. Contrariwise, if the inflow rate of carrier fluid is small, resistance 42 will be large and the interval afforded by timer 50 will be relatively long so that valve 24 is retained in the closed position for a correspondingly long interval.

Thus, it will be seen that the present invention provides a timing system for diatomaceous earth slurry delivery that automatically compensates for varying flow and contamination conditions and which system is extremely uncomplex and readily adaptable to existing filter systems.

Although one embodiment of the present invention has been shown and described, it will be apparent that other adaptations and modifications can be made without departing from the true spirit and scope of the invention.

What is claimed is:

1. Apparatus for controlling injection of filtration medium into a filtration system wherein a contaminated carrier fluid is transported to a filter through a pipe, said apparatus comprising a reservoir for the filtration medium, a conduit extending from said reservoir to said pipe for conducting filtration medium from said reservoir to said pipe, a solenoid valve in said conduit operable between an energized position at which flow therethrough is permitted and a de-energized position at which flow therethrough is arrested, a power source for effecting energization of said solenoid valve, circuit means for connecting said power source to said solenoid valve, said circuit means including first and second relays having normally closed contacts in a series with said power source and said solenoid so that said solenoid is energized from said power source when said relays are both in a normal quiescent state, means for sensing the degree of contamination of the carrier fluid, means responsive to said last sensing means for energizing said second relay after a time delay proportional to the degree of contamination of the carrier fluid thereby to de-energize said solenoid valve so as to arrest flow through said solenoid valve, means for sensing the flow rate of carrier fluid through said pipe, means actuable after said second relay energizing means and responsive to last said sensing means for energizing said first relay after a delay that is inversely proportional to the flow rate of contaminated carrier fluid through said pipe, and means responsive to energization of said first relay to reset said relays to a quiescent state so as to energize again said solenoid valve.

References Cited

UNITED STATES PATENTS

| | | | |
|---|---|---|---|
| 2,164,019 | 6/1939 | Perry | 210—101 X |
| 2,243,826 | 5/1941 | Nielsen et al. | 210—89 X |
| 2,299,529 | 10/1942 | Crampton | 210—96 |
| 2,971,648 | 2/1961 | Lane et al. | 210—75 |
| 3,199,677 | 8/1965 | Schneider | 210—138 X |
| 3,349,913 | 10/1967 | Schneider | 210—96 X |

FOREIGN PATENTS

| | | |
|---|---|---|
| 717,479 | 10/1954 | Great Britain. |
| 908,879 | 10/1962 | Great Britain. |

REUBEN FRIEDMAN, *Primary Examiner.*

J. ADEE, *Assistant Examiner.*

U.S. Cl. X.R.

210—101, 103, 193